No. 3,785. REISSUED JAN. 4, 1870.

W. H. & J. MILLIKEN.

PAPER FOLDING MACHINE.

3 SHEETS—SHEET 1.

Witnesses:
E. W. Griffin
W. H. Fuller

S. C. Forsaith Ass'r
of W. H. & J. Milliken
By C. A. Dangerfield
Atty

THE NORRIS PETERS CO., PHOTO-LITHO., WASHINGTON, D. C.

No. 3,785. REISSUED JAN. 4, 1870.
W. H. & J. MILLIKEN.
PAPER FOLDING MACHINE.
3 SHEETS—SHEET 2.
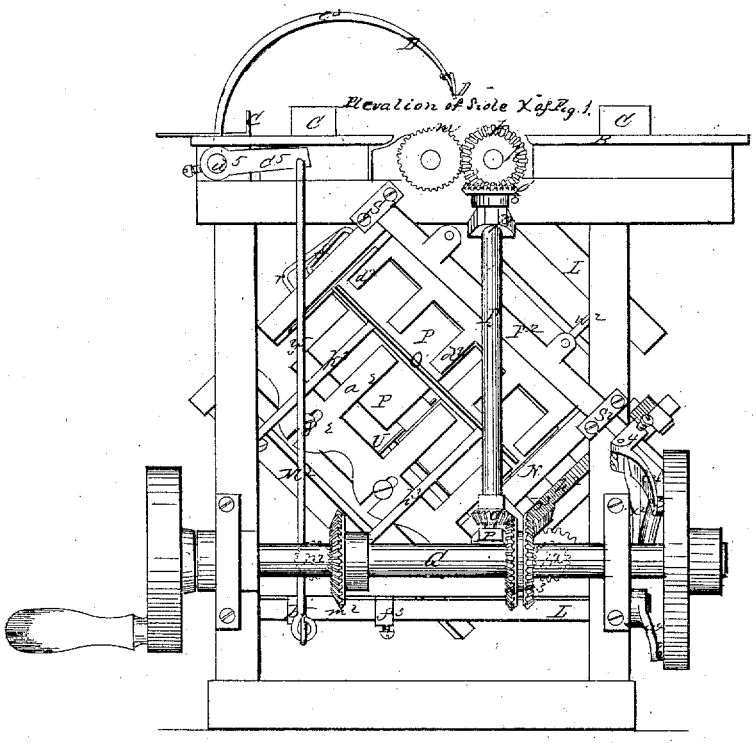
Fig. 2.
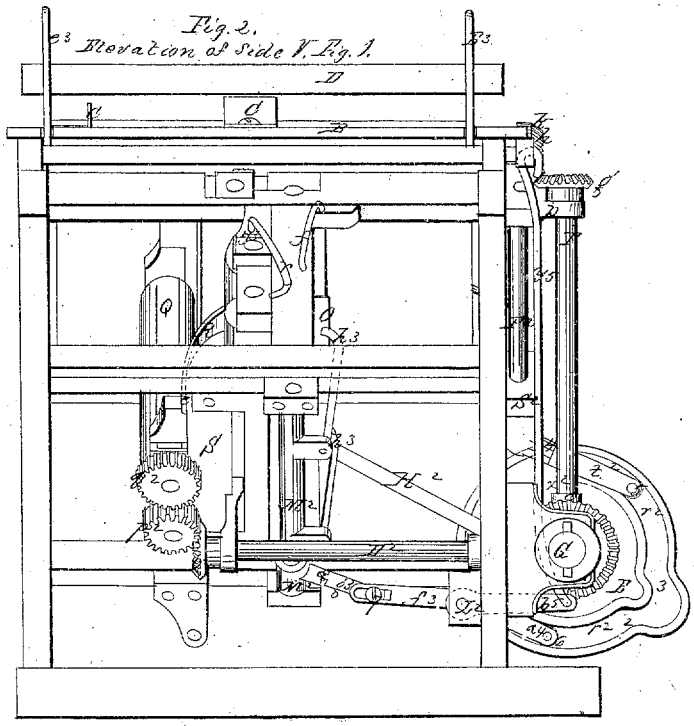
THE NORRIS PETERS CO., PHOTO-LITHO., WASHINGTON, D. C.

No. 3,785. REISSUED JAN. 4, 1870.

W. H. & J. MILLIKEN.

PAPER FOLDING MACHINE.

3 SHEETS—SHEET 3.

Elevation of Side Z of Fig. 1.

Section on line A.A. Fig. 1.

THE NORRIS PETERS CO., PHOTO-LITHO., WASHINGTON, D. C.

United States Patent Office.

S. C. FORSAITH, OF MANCHESTER, NEW HAMPSHIRE, ASSIGNEE, BY MESNE ASSIGNMENTS, OF WILLIAM H. MILLIKEN AND JOHN MILLIKEN.

*Letters Patent No.* 31,578, *dated February* 26, 1861; *reissue No.* 3,785, *dated January* 4, 1870.

DIVISION A.

IMPROVEMENT IN PAPER-FOLDING MACHINES.

The Schedule referred to in these Letters Patent and making part of the same.

*To all whom it may concern:*

Be it known that WILLIAM H. MILLIKEN and JOHN MILLIKEN, of Manchester, in the county of Hillsborough, and State of New Hampshire, did invent certain new and useful Improvements in Machines for Folding Sheets of Paper, of which the following is a full, clear, and exact description, reference being had to the accompanying drawings, figures, and letters of reference thereon, making part of this specification, of which—

Figure 2 is an elevation of the side Y of the machine.

Figure 3 is an elevation of the side X of the machine.

Figure 1:
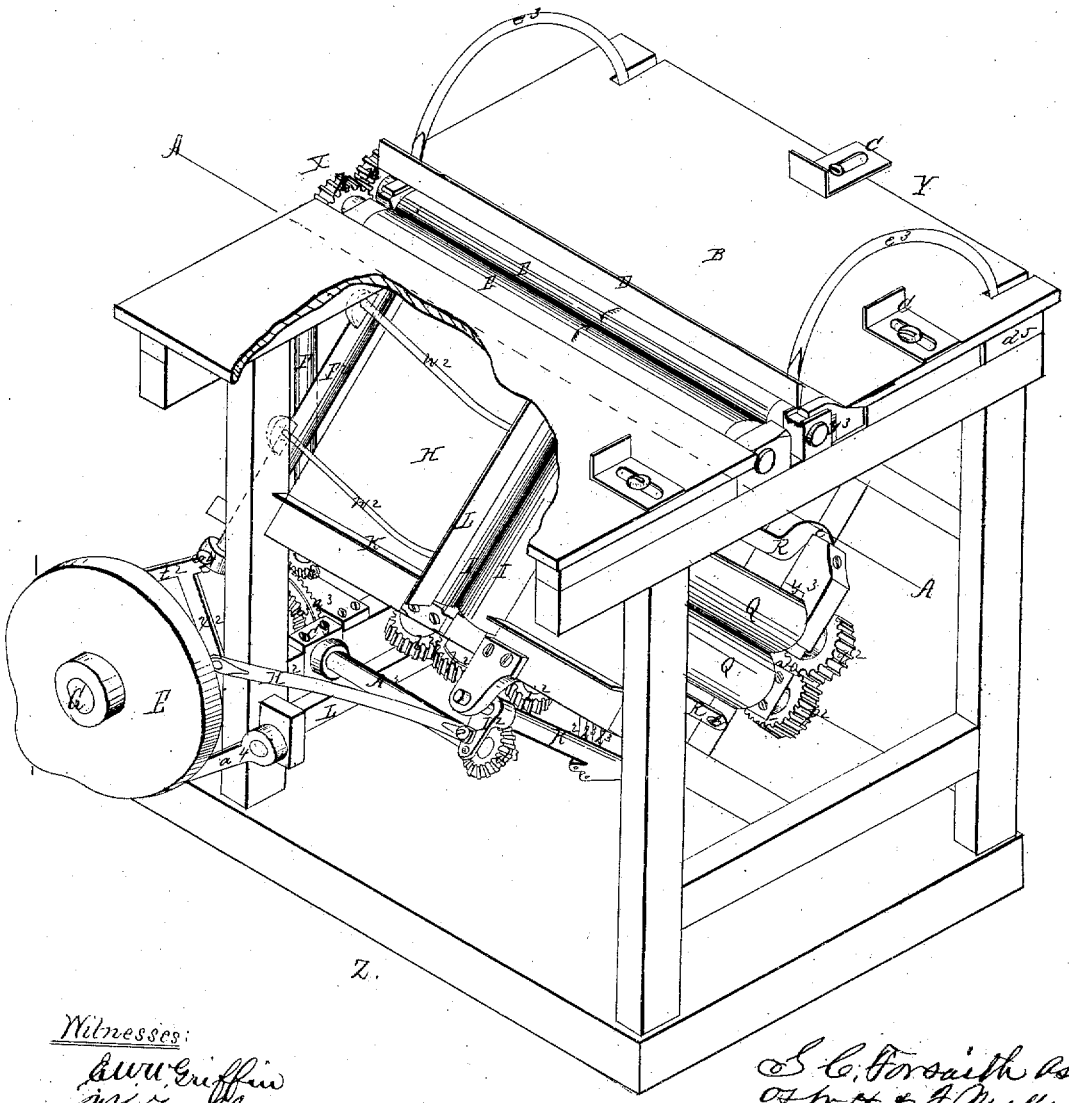
Figure 1 is a perspective view of the machine, a portion of the table being broken away to show the parts beneath.
Figure 4:
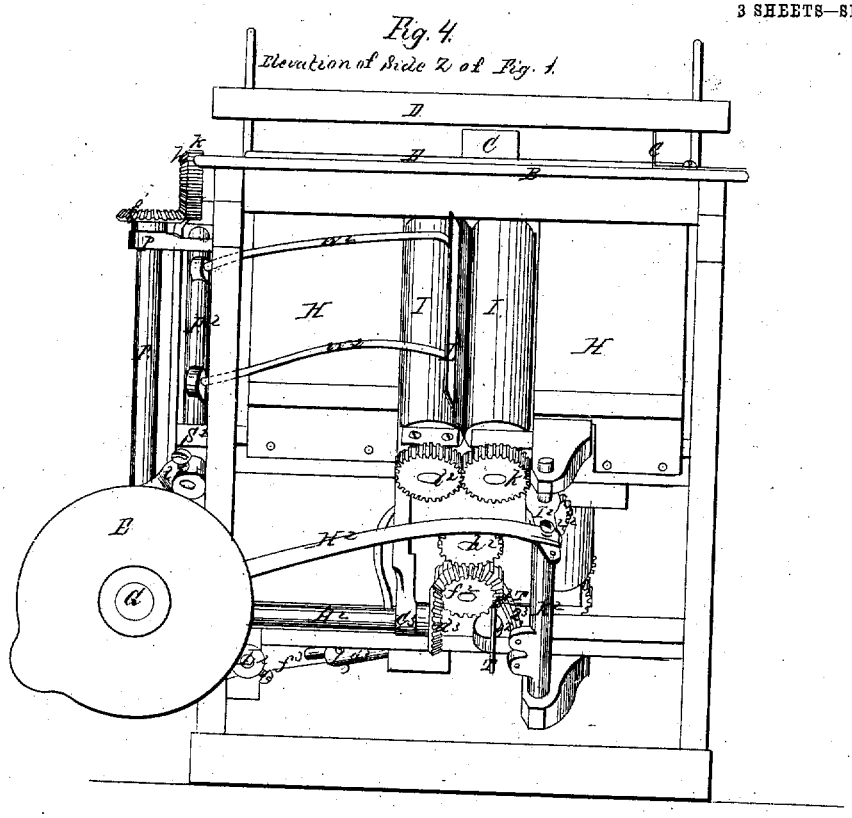
Figure 4 is an elevation of the side Z of the machine.
Figure 5:
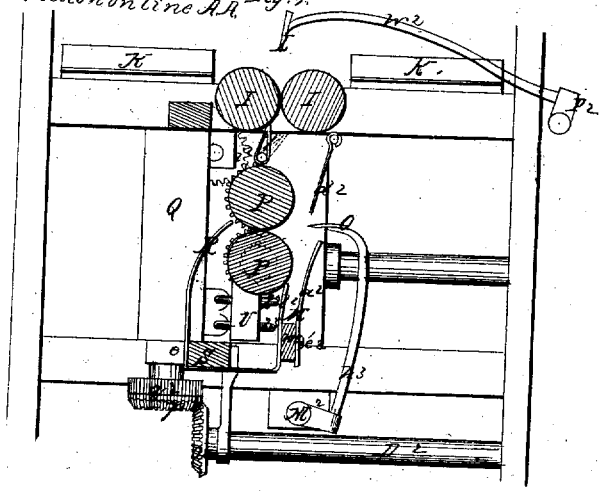

Figure 5, a section upon the line A A of fig. 1, on a plane perpendicular to the second and third pairs of rolls, and parallel with the fourth pair.

Similar letters of reference indicate like parts in all the drawings.

The attempts heretofore made to dispense with the tapes in paper-folding machines working with straight edges or knives and rollers, have thus far failed, as the paper, after it escapes from the first pair of rolls, had nothing to prevent it from falling over against the second knife, and if this knife were placed sufficiently near, to assist in sustaining the paper, it would interfere with it, as its doubled edge emerged from the preceding pair of rolls, and destroy the sheet.

The sheet, also, as it passed through the rolls, would hang in them, until its upper edge escaped from them, and, owing to the irregularities which occur in the form of the sheets, one corner would often become disengaged from the roll before the other, and the sheet would not fall square upon the stop below, which would entirely destroy the register.

On these accounts it has not been found practicable, thus far, to make a knife and roller-machine to operate without tapes.

This invention has for its object to dispense with the tapes in machines of this class; and consists in the arrangement and combination of various parts of machinery, which will be fully described hereafter.

To enable others familiar with the art to make and use this invention, a description of its construction and operation will be given.

The paper to be folded is placed upon the first table B, with its central line, through which the first fold is to be made, directly over the line of contact of the first pair of rolls E with each other, and its central line in the opposite direction perpendicularly of the line of contact of the second pair of rolls I I with each other.

The rolls E are arranged, in the customary manner, in the centre of the table B, and with their upper convex surface slightly above the plane of its upper surface. These rolls are revolved by suitable mechanism, and the sheet is entered between them by the first knife or folding-edge D, which descends at the proper moment, and is operated in a manner that will be fully described hereafter.

Beneath the table B, and placed at an angle of forty-five degrees thereto, is a second table, H, in the centre of which is placed the second pair of rolls I, fig. 1.

The sheet of paper having disengaged itself from the first pair of rolls, slides down the inclined table H, until its folded edge strikes against the stationary gauges K, when the second knife strikes it, and it is again doubled and carried through between the rolls I. Immediately between the latter rolls, is a guide-plate, *q*, which is capable of being vibrated upon its axle 1, so as to bring it into one or other of the positions indicated in full and red lines in fig. 5, into either of which it may be placed, by shifting the bent rod *r*, figs. 2 and 3, attached to its axle.

When the sheet is to receive four folds, the guide-plate is placed in the position seen in full lines in fig. 5, and the sheet, as it emerges from the rolls I, drops into a gauge-trough, M, the bottom *m* of which is parallel with the roll I, and is also capable of adjustment more or less near to the rolls, so as to bring the folded edge of the paper at the required distance beneath the line of contact of the third pair of rolls with each other.

The front and back of the trough M is formed of sheet-metal fingers $a^2$ $b^2$, secured to the frame-work between which the bottom *m* is adjusted by means of screws $c^2$.

The bottom of the trough M is also parallel with the third pair of rolls P, which, like rolls I, is inclined at an angle of forty-five degrees to the horizon. The stationary gauges K, near the lower edge of the second table H, are placed slightly above the plane of the side N of the trough, so that the sheet, on reaching the bottom of the trough M, has but a short distance to slide before it comes in contact with the side N, when it stops.

The knife O now strikes it, and enters it between the third pair of rolls P, when it receives the third fold, this third fold being parallel with the second, and the second and third pairs of rolls are parallel with each other.

On emerging from the third pair of rolls, the folded edge of the sheet strikes against the curved metal guide R, which deflects it, and conducts it down on the bar S. This bar being inclined at an angle of forty-five degrees, and parallel with the rolls P, the sheet, on reaching it, slides down it until it reaches the adjustable gauges T, when it is arrested in the proper position to be struck in the middle by the fourth knife U, which now forces it between the fourth pair of rolls Q, when it receives its fourth and final fold, and is delivered out of the machine.

The knife U is let into the lower roll P, which has a groove turned in it to receive it.

It will be seen, from the relative position of the rolls to each other, that the second fold is at right angles to the first, the third parallel with the second, and the fourth at right angles to the third.

If it be required to dispense with the third fold, the guide-plate $q$ is shifted into the position seen in red lines in fig. 5, and the curved guides R are swung round the point $e$, out of the way, a larger knife being substituted for the short one, U.

The sheet now passes, after leaving the rolls I, directly in front of the rolls Q, its folded edge striking against the inclined bar S, as before described, down which it slides until it is arrested by the adjustable stops T, with its centre opposite to the knife U, which strikes it between the rolls Q, when it receives its third and final fold, and passes out of the machine.

When the sheet is to receive four folds, the guide-plate $q$, as before stated, is placed in the position seen in blue in fig. 5, and the sheet, on emerging from between the rolls I, is guided, by the fingers $d^2$, into the trough M, and prevented from striking the knife as it descends.

The details of the mechanism by which the moving parts are actuated, will now be described.

All the motions of the machine are derived from the main driving-shaft G.

The first pair of rolls E is driven in the direction of the arrows, by means of the bevel-gear $g^1$ upon the top of a vertical shaft, F, which engages with a gear, $h$, upon the shaft of one of the rolls. The two rolls are caused to run together by the gears $k$ and $m$.

The vertical shaft F runs in brackets $p$, secured to the frame-work, and receives a rotary motion from a gear, $a$, upon the main driving-shaft G, which engages with a gear, $c$, on the bottom of the shaft.

The second and third rolls are driven as follows:

The bevel-gear $a^3$ engages with a pinion, $b^3$, on a shaft, $A^2$, which runs in suitable bearings, $c^2$, secured to the frame-work upon its inner end.

The shaft $A^2$ carries a bevel-gear, $d^3$, which engages with a similar gear, $f^2$, on the arbor of one of the third pair of rolls P. This arbor also carries a gear, $g^2$, which engages with a similar gear, $h^2$, upon the arbor of the other roll, P, and the two are thus caused to revolve together.

The gear $h^2$ engages with the intermediate gear $c^2$, on a short shaft projecting from the frame-work, and this gear engages with a similar gear, $k^2$, upon the arbor of one of the second pair of rolls I. The gear $k^2$ engages with the gear $l^2$, upon the other roll, by which the two are caused to run together.

The fourth pair of rolls, Q, is actuated as follows:

A bevel-gear, $m^2$, upon the driving-shaft G, gives motion to a pinion, $n^2$, on a shaft, $D^2$, which revolves in bearings attached to the frame-work, and carries, at its inner end, a bevel-gear, $O^2$, which drives a bevel-gear on the arbor of one of the rolls Q, the other roll being actuated therefrom through the gears $p^2$ and $q^2$.

The folding-edges or knives are actuated and caused to enter the opening between their rolls, for the purpose of forcing the paper between them, as follows:

The cam $E^2$, upon the shaft G, has a groove, $r^2$, which is concentric, with the exception of the portion from 2 to 3, and this cam-groove gives motion to all the straight-edges or knives as follows:

$F^2$ is a shaft, which is vibrated a short distance in its boxes $s^2$, by an arm, $t^2$, which is hinged thereto at 4, and carries a roller at its other end. 5, that plays in the cam-groove $r^2$.

From the shaft F project the arms $u^2$ of the knife L.

When the roller 5 is running in the concentric portion of the groove $r^2$, the knife L is elevated at its greatest distance from the rolls I, during the interval the sheet, having been struck in between the first pair of rolls, is running down the inclined table H, and, as the roller 5 passes through the portion 3 to 2 of the cam-groove, the knife is suddenly depressed and again raised.

The fourth knife is actuated with the second one, as follows:

To the arm $t^2$ is attached another arm, $x^2$, which is connected, by means of the rod $H^2$, with a short arm, $I^2$, projecting from a shaft, $K^2$, to which are attached the arms $z^3$ of the fourth knife U. This knife is then vibrated simultaneously with the second knife L.

The first and third knives are actuated as follows:

An arm, $a^4$, projecting from the end of a shaft, $L^2$, carries a roll, 6, which plays in the cam-groove, at a distance of one hundred and eighty degrees from the roll 5, and, by means of the same cam-groove $r^2$, the shaft $L^2$ is vibrated a short distance in the bearings, once for every complete revolution of the driving-shaft.

An arm, $b^5$, projecting from the shaft $L^2$, is connected, by means of the rod $y^5$, with an arm, $c^5$, projecting from the shaft $d^5$, to which are attached the arms $e^3$ of the first knife D.

From the opposite side of the shaft $L^2$ projects an arm, $f^3$, which is jointed, at 7, to an arm, $g^3$, which is hinged, at 8, to a short stud, projecting from the vibrating shaft $M^2$, to which is attached the arm $h^2$ of the folding-edge O.

The joints, at 7 and 8, form a universal joint, which is rendered necessary by the fact that the shafts $M^2$ and $L^2$ vibrate in planes, inclined forty-five degrees, the one to the other.

*Recapitulation of Operation.*

The sheet is delivered upon the table B, and registered by the adjustable gauges C, or any other suitable mechanism, and the sheet is carried over the first pair of rolls E, and under the knife D, which, as it drops upon the sheet, causes it to pass through in a double fold. The doubled sheet now descends upon the table H, as it passes through the first pair of rolls, and, on escaping from the latter, it continues to slide down until arrested by the stationary gauges K, against which its folded edge rests.

The roll 5, upon the arm $t^2$, now enters the eccentric portion 2 to 3 of the cam-groove $r^2$, by which the shaft $F^2$ is vibrated, and the knife L is caused to descend, by which the double sheet is forced between the second pair of rolls I, and the now twice-folded sheet, if it is to receive four folds, (the second and third being parallel to each other,) is guided, by the plate $q$ and the fingers $d^2$, down into the trough M and in front of the rolls P, the trough M being raised or lowered by means of the screw $c^2$, so as to bring the sheet into the proper position to strike it in the centre.

The sheet now slides down the trough M until it reaches the side N of the trough, when it is arrested.

The rock-shaft $M^2$ being now vibrated, by means of the connections already explained, the knife O forces the already twice-doubled sheet between the rolls P, which gives to it its third fold. Emerging from these rolls, it falls upon the bar S, which is parallel with the fourth pair of rolls, and down which it slides, until arrested by the stops T, which have been previously adjusted so as to bring the centre of the paper opposite to the fourth knife U, which now strikes the fourth and last pair of rolls Q, which finish the operation, and deliver it out of the machine.

If the sheet is to receive but three, the third fold being dispensed with, the guide-plate $q$ is thrown into the position shown in red in fig. 5, the guides R are swung out of the way, and the knife U is replaced by a longer one, and the operation continued, as already explained.

To insure the seizing of the paper by the rolls, and to permit the passage of two sheets, should they, from accident, be introduced together, the boxes of one of each pair of rolls are forced up to the other by springs $y^3$, which yield for any extra thickness of paper presented to pass through.

What is claimed, as the invention of WILLIAM H. MILLIKEN and JOHN MILLIKEN, is—

1. The combination, with the horizontal rolls E, of the inclined rolls I and inclined table H, so arranged, that the sheet of paper, after receiving its first fold, shall slide down the inclined table to gauges, which determine its position for the second fold without loss of register, and without the use of tapes or belts, substantially as described and specified.

2. The combination and arrangement of the inclined table H, inclined rolls I, gauges K, and knife L, for making the second fold in the sheet, substantially as described and specified.

3. The combination of the inclined trough M, with its fingers $a^2$ $b^2$ $d^2$, so arranged that the sheet shall be guided into the trough after passing the rolls I, and slide to the position for its third fold, substantially as described.

4. The inclined rolls P and Q, at right angles to each other, in combination with the knife U, substantially as described and specified.

5. The guide-plate $q$, employed for deflecting the sheet in one direction or the other, for giving it three or four folds, without the necessity of unshipping or stopping the operation of the machine, substantially as described and specified.

6. The combination, with the folding-knives, of a pair of rollers, one of which is kept in contact with the other by a spring-pressure, so as to readily yield to the edge of the folding-kife, the passage of double sheets, or any inequalities in the paper folded, substantially as described and specified.

S. C. FORSAITH.

Witnesses:
C. A. DURGIN,
EDWARD E. OSBORN.